United States Patent
Trummer et al.

(10) Patent No.: US 6,184,904 B1
(45) Date of Patent: *Feb. 6, 2001

(54) CENTRAL PROCESSING UNIT FOR A PROCESS CONTROL SYSTEM

(75) Inventors: Georg Trummer, Amberg; Werner Burger, Kümmersbruck, both of (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/127,924

(22) Filed: Sep. 28, 1993

(30) Foreign Application Priority Data

Sep. 28, 1992 (EP) .................................. 92116560

(51) Int. Cl.[7] ................................................ G06F 15/20
(52) U.S. Cl. .......................................... 345/520; 345/526
(58) Field of Search .................. 364/DIG. 1, DIG. 2; 345/520, 526; 709/212, 221; 703/23

(56) References Cited

U.S. PATENT DOCUMENTS

| | | | |
|---|---|---|---|
| 3,676,861 | * | 7/1972 | Ruth ............................. 364/DIG. 1 |
| 3,812,468 | * | 5/1974 | Wollum et al. ...................... 714/4 |
| 4,065,809 | * | 12/1977 | Matsumoto ......................... 364/200 |
| 4,144,407 | * | 3/1979 | Zaffignani et al. .................. 370/299 |
| 4,200,930 | * | 4/1980 | Rawlings et al. .................... 709/212 |
| 4,495,569 | * | 1/1985 | Kagawa ............................. 364/200 |
| 4,654,654 | * | 3/1987 | Butler et al. ....................... 340/825.5 |
| 4,713,758 | * | 12/1987 | DeKelaita et al. ................... 364/200 |
| 4,907,070 | * | 3/1990 | Wesolowski ........................ 348/498 |
| 5,131,092 | * | 7/1992 | Sackmann et al. ................... 395/800 |
| 5,210,747 | * | 5/1993 | Gauthier et al. .................... 370/85.1 |
| 5,222,213 | * | 6/1993 | Petty ............................... 395/164 |
| 5,249,299 | * | 9/1993 | Iwata ............................... 395/800 |
| 5,281,963 | * | 1/1994 | Ishikawa et al. .................... 340/825.5 |
| 5,317,747 | * | 5/1994 | Mochida et al. ..................... 395/725 |
| 5,325,120 | * | 6/1994 | Kuehnle ............................ 347/43 |
| 5,485,579 | * | 1/1996 | Hitz et al. ......................... 709/221 |
| 5,655,106 | * | 8/1997 | Smith .............................. 703/23 |

FOREIGN PATENT DOCUMENTS

| | | |
|---|---|---|
| 0 088 805 | 9/1983 | (EP) . |
| 0 298 396 | 1/1989 | (EP) . |
| 0 496 097 | 9/1992 | (EP) . |
| 2 250 106 | 5/1992 | (GB) . |

OTHER PUBLICATIONS

IEEE Transactions On Vehicular Technology, vol. 39, No. 3, 1990, New York, Kamal N. Majeed: Dual–processor Controller with Vehicle Syspension Applications.

* cited by examiner

Primary Examiner—Majid Banankhah
(74) Attorney, Agent, or Firm—Kenyon & Kenyon

(57) ABSTRACT

A process system, for example a storage-programmable control, having a central unit (1) and a number of peripheral devices, for instance I/O assemblies, controller assemblies, etc., which are connected to the central unit (1) via a bus system (7). The central unit (1) includes two processor systems (2, 4) which are separate from each other, one processor system (2) processing real-time tasks and one processor system (4) processing tasks which are not time-critical. The bus system (7) is split into two separate, individual buses (7', 7") which are associated with the processor systems (2, 4). In this way, the processor systems (2, 4) are uncoupled from each other upon access to the bus system (7).

27 Claims, 2 Drawing Sheets

CENTRAL PROCESSING UNIT FOR A PROCESS CONTROL SYSTEM

BACKGROUND OF THE INVENTION

The present invention relates to a central unit for a process control system, for instance a storage-programmable control system which consists of a central unit and a number of peripheral devices which are connected to the central unit by a bus system, the central unit having at least one control processor system with a control processor for the processing of real-time tasks as well as at least one additional remainder processor system which is separate from the control processor system and has a remainder processor for processing tasks which are not time-critical.

Processor control systems are widely used. As a rule, they have two tasks to fulfill. Namely, on the one hand, an application program must be processed in real time and on the other hand, the outside world, for instance, other process control systems, must be communicated with, programs must be loaded and peripheral devices must be communicated with.

The implementation of both of these tasks by the same central unit has up to now had the result that the two tasks have negatively influenced each other. In particular, the so-called alarm-reaction time was relatively long and furthermore not accurately reproducible due to the carrying out of two tasks. Since a part of the computing capacity had to be used for communication and management tasks, the theoretically possible alarm reaction time could not be reached.

European Patent Document No. EP-A-0496,097 relates to a process control system which has a central unit similar to that described above. However, even in this system, the carrying out of the two above-mentioned tasks cannot take place separately. Upon access by the communication processor to the common bus system, the running of the application program must namely be interrupted by a control processor, since there is only one common bus.

SUMMARY OF THE INVENTION

The present invention to provides a process control system in which the two processor systems affect each other as little as possible. In particular, the full communication power of the central unit is capable of use and the alarm-reaction time is nevertheless low and reproducible.

The bus system has a control bus and a remainder bus, the control bus being connected to the control processor system and the remainder bus being connected to the remainder processor system. In this way, accesses of the processor systems to the peripheral units do not affect each other. The processor systems are therefore almost completely uncoupled from each other.

If the control processor system and the remainder processor system can be connected to each other via blockable coupling elements, for instance, tristate-HCMOS drivers, the processor systems can have access in each case to the other processor system.

This access is necessary, in particular, upon the starting up of the process control system in order that programs which are centrally stored can be copied into the corresponding processor system.

BRIEF DESCRIPTION OF THE DRAWINGS

Further advantages and details will become evident from the following description of an embodiment of the present invention with reference to the attached drawings.

DETAILED DESCRIPTION

Figure 1:
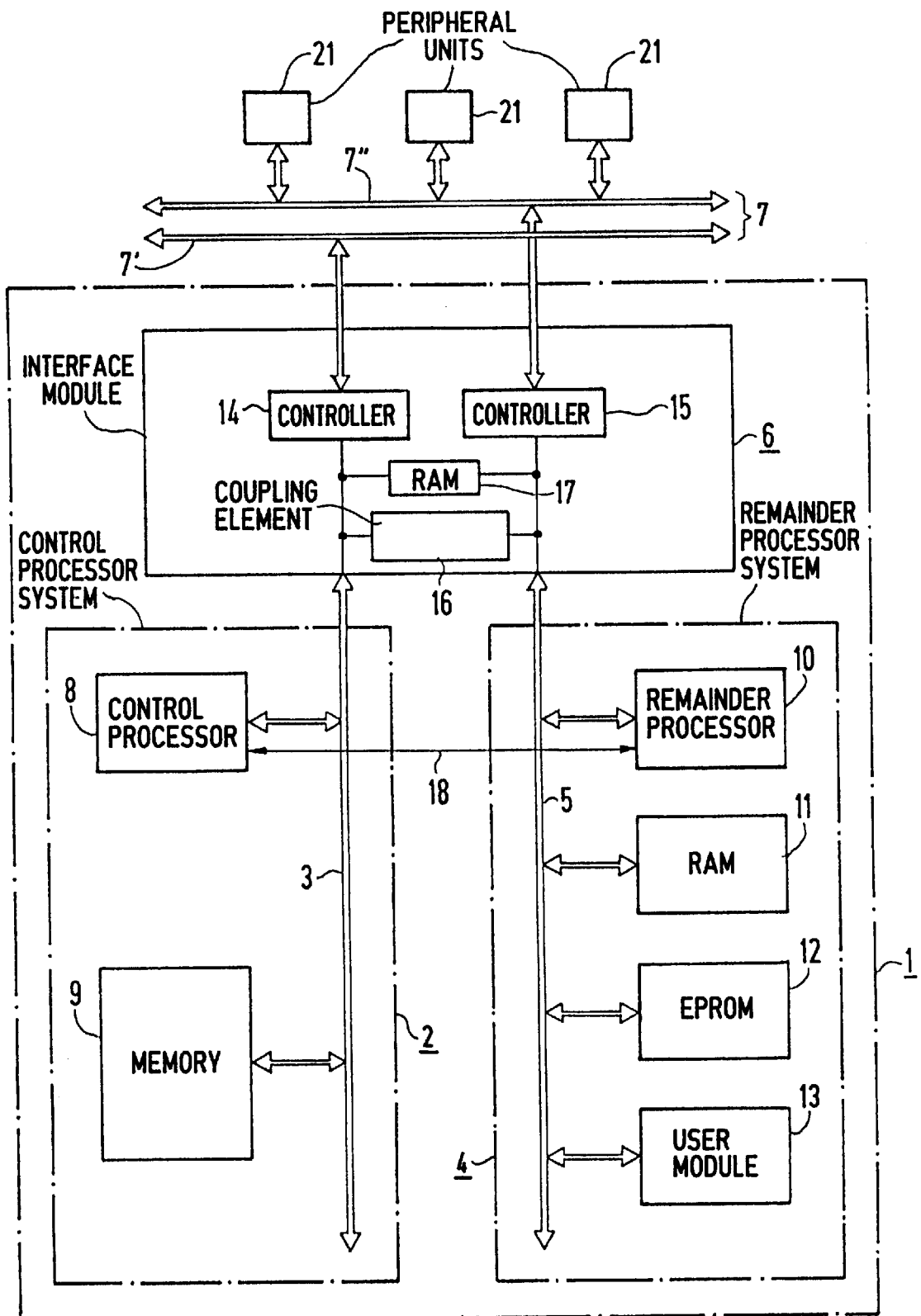
FIGS. 1 and 2 each illustrate a block diagram of the central unit of a storage-programmable control system according to embodiments of the present invention.

As illustrated in FIG. 1, the central processing unit 1—or short the central unit 1—of a storage-programmable control has a control processor system 2 with an internal bus 3 and a remainder processor system 4 with an internal bus 5. The processor systems 2, 4 are connected to an external bus system 7 via an interface module 6. Peripheral units 21, for instance input modules, output modules, controller assemblies, etc., which are shown only diagrammatically in FIG. 1, are connected to the bus system 7, which consists of the control bus 7' and the remainder bus 7".

The control processor system 2, in addition to the internal bus 3, has a control processor 8 and one or more memories 9. The control processor system 2 may optionally contain further components, for instance a coprocessor (not shown) or direct periphery connections. The control processor system 2 carries out all control tasks which require a real-time reaction and therefore, for instance, the running of the application program, the process image transfer or alarm reactions. The control processor 8 is a special processor, preferably an application-specific integrated circuit (ASIC). In this way, an optimal tailoring of the control processor 8 to control tasks as such and to the control programming language used in particular is possible.

The remainder processor system 4 also has a remainder processor 10. This remainder processor 10 is preferably a standard microprocessor, for instance a Siemens 80166. The remainder processor system 4 also has a RAM 11 and EPROM 12. In addition, a user module 13 which is developed either as buffered RAM or as erasable read-only memory (EPROM, EEPROM, Flash-EPROM) can also be coupled to the bus 5. The remainder processor system 4 is separate from the control processor system 2.

The remainder processor system 4 carries out all tasks which are not directly related to time-critical control tasks. These consist, for instance, of the communication with other central units, the reloading of programs or the non-control-related data communication with the peripheral units. The interfaces (not shown in the drawing) to a programming device and to other central units are therefore part of the remainder processor system 4.

As already mentioned, the processor systems 2, 4 are connected to the bus system 7 via the interface module 6. Access to the bus system 7 takes place in this connection via the controllers 14, 15, which are integral components of the interface module 6.

Furthermore, the interface module 6 has a blockable coupling element 16 via which the buses 3 and 5 can be connected to each other. The coupling element 16 is, for instance a tristate HCMOS driver. By means of the coupling element 16 it is possible for the remainder processor 10 to have access to the bus 3 of the control processor system 2. In this way, for example, during the runup of the central unit 1, the operating system, which is permanently stored in the EPROM 12, can be copied, for instance, by the EPROM 12 into the memory 9 of the control processor system 2.

Furthermore, the interface module 6 has a dual ported RAM 17. Both the control processor 8 and the remainder processor 10 can have access to the dual ported RAM 17. By means of the dual ported RAM 17 and the control lines 18, the processors 8, 10 can coordinate with each other.

The interface module 6 is preferably also an application-specific integrated circuit (ASIC).

Upon the runup of the central unit 1, the remainder processor 10 is first initialized. After this self-initialization, the remainder processor 10, as mentioned above, copies the operating system from the EPROM 12 into the memory 9. The remainder processor 10, via one of the control lines 18, then starts the control processor 8 so that the latter can possibly initialize itself and then start the running of the control program.

During the normal operation of the central unit 1, the control processor 8 processes the application program. The remainder processor 10 carries out the management and communication tasks. The remainder processor 10 communicates, for instance, with a programming device (not shown). Many communication tasks can be handled by the remainder processor 10 alone, while, for other communication tasks, cooperation of the control processor 8 is necessary. For this purpose, the data which the control processor needs for carrying out the communication task is stored by the remainder processor 10 in the dual ported RAM 17. The remainder processor 10 then sends an interrupt signal via one of the control lines 18 to the control processor 8. The control processor 8 thereupon reads the data stored in the dual ported RAM 17 and carries out the communication task. After the communication task has been carried out, the control processor 8 stores the result in the dual ported RAM 17 and sends an interrupt signal to the remainder processor 10 over one of the control lines 18. The remainder processor 10 then reads the result of the communication from the dual ported RAM 17 and further carries out the communication task. The control processor 8 continues the running of the application program.

In the individual case, a communication can, however, also be started by the control processor 8. In such a case, the control processor 8 first places data in the dual ported RAM 17 and then entrusts the carrying out of the task to the remainder processor 10 via one of the interrupt lines 18.

The loading or reloading of the application program in the memory 9 is effected upon the initiative of the control processor 8. For this purpose, the control processor 8 deposits the task in the dual ported RAM 17 and starts the remainder processor 10 over one of the lines 18. The remainder processor 10 reads a part of the requested application program from the user module 13 and stores that part of the requested application program in the dual ported RAM 17. Thereupon, an interrupt signal is again sent by the remainder processor 10 to the control processor 8 via one of the control lines 18. The control processor 8 then reads the dual ported RAM 17 and stores the data in the memory 9. This process is repeated until the entire application program in question has been transferred into the memory 9.

As stated above, the application program affects the remainder processor only insofar as the remainder processor 10 receives a standard, well-tested task from the control processor 8. Errors in the application program can therefore not lead to malfunctions of the remainder processor 10. The remainder processor 10 is thereby able to monitor the central unit 1, including the control processor system 2. The remainder process system 4 therefore can be developed as a master system for the monitoring of the central unit 1.

As mentioned above, the control processor 8 and the remainder processor 10 operate in parallel. In this connection it may happen that both the control processor 8 and the remainder processor 10 desire access to the bus system 7. By the splitting of the bus system 7 into two separate individual buses 7', 7" associated with the corresponding processor systems 2, 4, both processor systems 2, 4 can, however, simultaneously have access to the bus system 7. Accesses to the same peripheral unit are, however, only permissible if the assembly is also developed accordingly. Simultaneous access by both processor systems 2, 4 to the same peripheral unit, however, occurs only very rarely in practice.

Furthermore, for special tasks, the remainder processor system 4 can also be connected to the control bus 7', and the control processor system 2 can also be connected to the remainder bus 7".

In the present invention, conflicts in access upon access to the bus system are practically excluded. Furthermore, separation of the bus system 7 from the internal buses 3, 5 is assured by the controllers 14, 15. The processor systems 2, 4 can therefore be developed independently of the construction of the bus system 7, for instance as 32-bit systems, even if the bus system 7 is an 8-bit system. The processor systems 2, 4 can also be operated independently of the bus system 7, for instance, with 20 MHz, even if accesses to the bus system 7 take considerably longer. Any intermediate storage or buffering of data which may be necessary is assumed in this connection by the controllers 14, 15.

Figure 2:
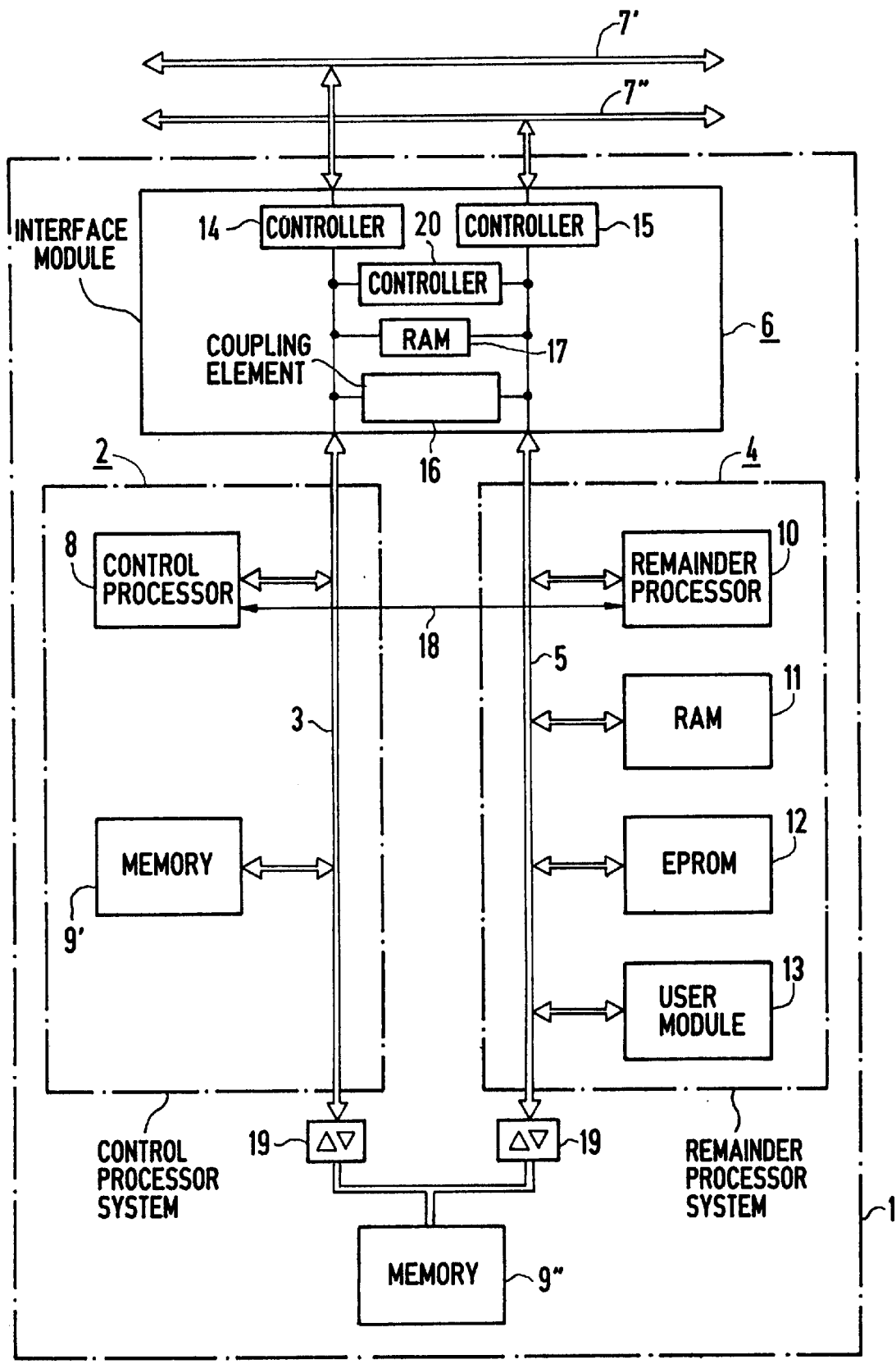

FIG. 2 illustrates a further improvement of the present invention. In accordance with FIG. 2, the memory 9 of the control processor system 2 is split into two individual memories 9', 9". The individual memory 9" is connected to both processor systems 2, 4 via bi-directional, blockable coupling elements 19, typically HCMOS drivers. By means of this configuration, it is easier to store data, for instance the application program of the user module 13, in the memory 9". In particular, when the operating system of the control processor 8 is stored in the memory 9' and the application program of the control processor 8 is stored in the memory 9", the application program can be reloaded by the remainder processor 10 even during the running of operating system functions by the control processor 8. In this way, an additional increase in power of the central unit 1 results.

As an alternative or in addition, the interface module 6 can also include a third controller 20, which is connected to the two processor systems 2, 4. The controller 20 is preferably also integrated in the interface module 6. By means of the controller 20, the required remainder communication between the control processor system 2 and the remainder processor system 4 can be carried out even more efficiently.

What is claimed is:

1. A process control system comprising a central unit and a plurality of peripheral devices which are connected to the central unit via a bus system, said central unit comprising:

at least one control processor system including a control processor processing time critical tasks such as real-time tasks; and at least one additional remainder processor system which is separate from the control processor system and includes a remainder processor processing tasks which are not time critical;

wherein the bus system includes a control bus and a remainder bus, the control bus being connected to the control processor system, and the remainder bus being connected to the remainder processor system; and wherein the plurality of peripheral devices are connected independently to each of the control bus and the remainder bus.

2. A process control system according to claim 1, wherein the control processor system and the remainder processor system are connected to the bus system via at least one controller.

3. A process control system according to claim 2, wherein said at least one controller is integrated in an interface module.

4. A process control system according to claim 1, wherein at least one controller is connected to both the control processor system and the remainder processor system.

5. A process control system according to claim 4, wherein the at least one controller is integrated in an interface module.

6. A process control system according to claim 1, wherein the control processor system and the remainder processor system are connected with each other via blockable coupling elements coupling the control processor system and the remainder processor system.

7. A process control system according to claim 6, wherein the blockable coupling elements are tristate-HCMOS drivers.

8. A process control system according to claim 6, wherein the blockable coupling elements are integrated in an interface module.

9. A process control system according to claim 1, wherein the process control system includes at least one dual ported memory having two access paths, one access path being connected to the control processor system and one access path connected to the remainder processor system.

10. A process control system according to claim 9, wherein the dual ported memory is integrated in an interface module.

11. A process control system according to claim 3, wherein the interface module is an application-specific circuit.

12. A process control system according to claim 5, wherein the interface module is an application-specific circuit.

13. A process control system according to claim 8, wherein the interface module is an application-specific circuit.

14. A process control system according to claim 10, wherein the interface module is an application-specific circuit.

15. A process control system according to claim 1, wherein the control processor and the remainder processor are connected to each other via control lines.

16. A process control system according to claim 1, wherein the control processor is a special processor such as an application-specific circuit, and the remainder processor is a standard microprocessor.

17. A process control system according to claim 1, wherein the remainder processor system is a master system for monitoring the central unit.

18. A process control system according to claim 1, wherein each of the control processor system and the remainder processor system includes at least one memory.

19. A central processing unit for a process control system comprising a central unit and a plurality of peripheral devices which are connected to the central unit via a bus system, said central unit comprising:
   at least one control processor system including a control processor processing time critical tasks such as real-time tasks; and
   at least one additional remainder processor system which is separate from the control processor system and includes a remainder processor processing tasks which are not time critical;
   wherein the bus system includes a control bus and a remainder bus, the control bus being connected to the control processor system; and
   wherein the plurality of peripheral devices are connected independently to each of the control bus and the remainder bus.

20. A central processing unit according to claim 19, wherein the control processor system and the remainder processor system are connected to the bus system via at least one controller.

21. A central processing unit according to claim 19, wherein at least one controller is connected to both the control processor system and the remainder processor system.

22. A central processing unit according to claim 19, wherein the control processor system and the remainder processor system are connected with each other via blockable coupling elements coupling the control processor system and the remainder processing system.

23. A central processing unit according to claim 19, wherein the central processing unit includes at least one dual ported memory having two access paths, one access path being connected to the control processor system and one access path connected to the remainder processor system.

24. A central processing unit according to claim 19, wherein the control processor and the remainder processor are connected to each other via control lines.

25. A central processing unit according to claim 19, wherein the control processor is a special processor such as an application-specific circuit, and the remainder processor is a standard microprocessor.

26. A central processing unit according to claim 19, wherein the remainder processor system is a master system for monitoring the central unit.

27. A process control system according to claim 19, wherein each of the control processor system and the remainder processor system includes at least one memory.

* * * * *